United States Patent [19]

Romeu

[11] Patent Number: 4,637,107

[45] Date of Patent: Jan. 20, 1987

[54] MACHINING MACHINE

[76] Inventor: Ramon Romeu, La Segarie, Saint-Jean-Lespinasse, 46 400 Saint Cere, France

[21] Appl. No.: 795,360

[22] PCT Filed: Feb. 27, 1985

[86] PCT No.: PCT/FR85/00034

§ 371 Date: Oct. 15, 1985

§ 102(e) Date: Oct. 15, 1985

[87] PCT Pub. No.: WO85/03893

PCT Pub. Date: Sep. 12, 1985

[51] Int. Cl.⁴ .................... B23C 1/00; B23P 23/02; B23Q 1/16
[52] U.S. Cl. .................... 29/27 C; 29/560; 409/168; 409/202; 409/235
[58] Field of Search .................... 29/560, 27 C, 42, 47; 409/168, 235, 201, 202, 212, 216, 192; 269/61

[56] References Cited

U.S. PATENT DOCUMENTS

| | | | |
|---|---|---|---|
| 2,386,736 | 2/1945 | Wyrick | 29/47 X |
| 3,475,995 | 11/1969 | Spuhler | 29/42 X |
| 3,559,530 | 2/1971 | Wagner et al. | 409/192 X |
| 3,613,502 | 10/1971 | Wagner et al. | 409/192 |
| 3,643,307 | 2/1972 | Ledergerber et al. | 29/47 X |
| 3,700,228 | 10/1972 | Peale | 269/61 |
| 3,798,721 | 3/1974 | Schalles | 29/42 |

Primary Examiner—Z. R. Bilinsky
Attorney, Agent, or Firm—Larson and Taylor

[57] ABSTRACT

The universal machine-tool for carrying machining operations comprises, mounted between two uprights, a cradle pivoting about an axis and carrying the table, susceptible of being rotatingly driven whereas a general slider enables to bring closer to the part carried by the table on one hand a milling head movable according to three axes and on the other hand a drum carrier movable according to two axes, the machine enabling to carry out milling, turning and boring operations.

10 Claims, 3 Drawing Figures

MACHINING MACHINE

The present invention relates to a machine tool for machining and encompasses in particular the field of milling machines having vertical spindles or horizontal spindles, boring machines and vertical and horizontal lathes.

Machines capable of carrying out machining operations of different types are at the present time only machine tools of a particular type to which additional elements are added. These machines are complex and have very limited fields of application. Consequently it is always necessary to provide a plurality of machines for machining a workpiece including a plurality of machining operations such as turning, milling, or boring. The workpiece to be machined must pass from one machine to the other with all the problems of handling and setting involved. The passage of the workpiece from one machine to the other is often long and costly, above all when the workpiece is of large volume, all of these requirements resulting in the necessity to possess a plurality of machines of different types with the following drawbacks:

Space consumed on the ground
Large number of operators
Investment cost
Time for handling the workpieces from one machine to the other
Setting up time for each machine
Cost of the workpieces to be produced Machine tools including a steady are known from the German Pat. No. 2,528,677 and French Pat. No. 2,407,040 which comprise an elongated cradle carried by a rotary steady mounted on the frame of the machine, said cradle supporting a rotary table and being itself movable in translation in a direction parallel to the geometric axis of rotation of the steady. Tools vertically guided on the frame permit milling or turning operations.

However, these machines do not permit the carrying out of a plurality of machine operations of different types. Further, their rigidity is far from being perfect owing to the cumulative deformations of the steady, the cradle and the translation means so that they can only be used for operations of low power. In particular, turning cannot be carried out with powerful motors.

A support for a workpiece to be machined is moreover known from U.S. Pat. No. 3,700,288 which comprises a cradle rotatable about an axis with a rotary table on the cradle, but this workpiece holder is adapted to be fixed in position on a conventional machine tool and does not permit carrying out machining operations of different types either.

The object of the present invention is to overcome these drawbacks and to provide a new machining machine which is capable of carrying out on the same workpiece machining operations of different types, such as milling in the vertical, horizontal, or any other position, boring, vertical or horizontal turning, with high power.

Another object is to provide such a machine which is compact and of small overall size.

Another object of the invention is to provide such a machine which is of a simple and cheap type.

Another object of the invention is to provide such a machine which is adapted to numerical control or a control integrated in a robotized unit.

The invention provides a machining machine comprising a cradle rotatively swingable on a frame, a table adapted to receive the workpiece to be machined, rotatively mounted on the cradle, and machining means carried by the frame, wherein the cradle is mounted to be movable about an axis for swinging the cradle, the axis of rotation of the table being fixed in translation relative to the cradle, and the machining means comprise turning, milling and/or boring tools supported by means of which some are movable in three directions in space so that said tools can be moved toward said table within a large range of inclination of the cradle relative to its axis.

Preferably, the geometric axes of the cradle and table are concurrent and, in a particularly preferred manner, the geometric axis of rotation of the cradle is located about the upper surface, i.e. the surface receiving the workpiece to be machined, of the table.

According to an advantageous feature of the invention, the said machining means are supported by a general slide movable in a plane spaced from the axis of rotation of the cradle, said plane being preferably parallel to this axis.

These means advantageously comprise a drum carrying the lathe tools, mounted on a support transversely movable relative to the general slide so as to be capable of moving toward the plate.

The general slideway preferably also supports a saddle movable along the general slideway in a direction parallel to the axis of rotation of the cradle and itself supporting a milling head or spindle which is movable relative to the saddle in a direction toward the table.

In a particularly preferred embodiment, the axis of rotation of the cradle is horizontal, the direction of displacement of the general slideway being also horizontal, perpendicular to said axis and spaced away upwardly from said axis. The lathe rotary drum is vertically slidable on the general slideway while the saddle is slidable on the general slideway in a horizontal direction parallel to the axis of rotation of the cradle, the milling head being vertically slidable on the saddle.

Thus it is possible to construct the machine according to the invention with a frame comprising, leading from a bed plate, two parallel vertical posts spaced apart from each other, with transverse stiffening means, said posts supporting trunnions corresponding to the axis of the cradle in a substantially central zone and forming, in their upper part, two slideways for the general slide.

According to an advantageous feature, each movable element has its own driving motor unitary with said element. These driving motors are advantageously motors adapted to numerical control.

Further features and advantages of the invention will be apparent from the following description given by way of a non limiting example with reference to the accompanying drawing, in which:

FIG. 3 is a plan view of the machining machine shown in FIG. 1.

Figure 1:
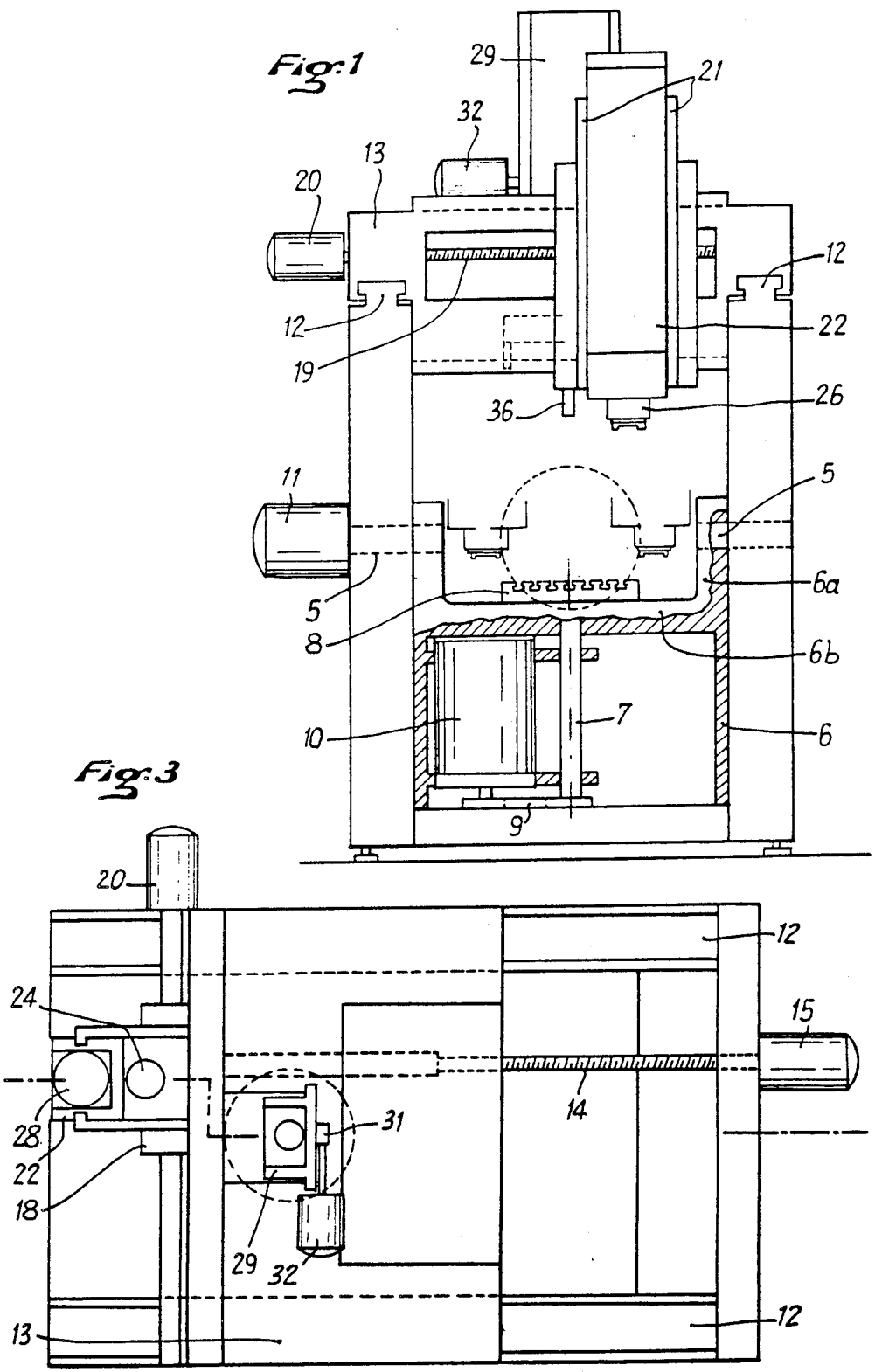
FIG. 1 is a diagrammatic front elevational view of the machining machine.

The illustrated machining machine comprises a horizontal bed plate 1 from which upwardly extend vertical posts 2 in the form of rigid plates interconnected at their rear ends by lower and upper stiffeners 3 and 4. The posts 2 respectively carry two horizontal trunnions 5 constituting an axis about which is swingable a cradle 6 having substantially the shape of a parallelepiped with two lateral arms 6a receiving the trunnions, an upper wall 6b extending between the arms 6a and inner bearing means 6c receiving a shaft 7 of a table whereby it is possible to drive in rotation a rotary table 8 guided on the upper wall 6b of the cradle and intended for fastening the workpiece to be machined.

Figure 2:
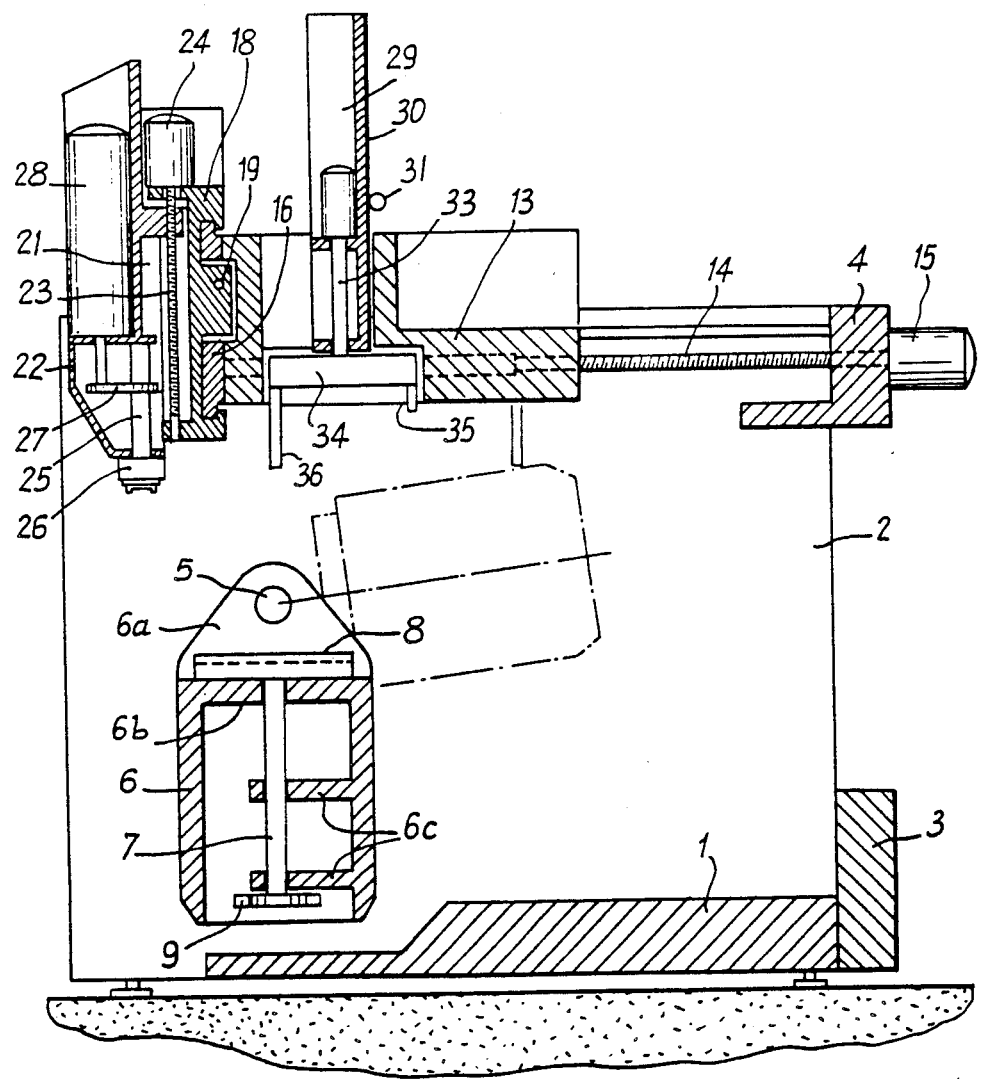
FIG. 2 is a longitudinal sectional view of the machine shown in FIG. 1.

As can be seen in the position represented in FIGS. 1 and 2, when the cradle 6 is in its vertical position, the table 8 is in a horizontal position and can be driven in rotation by the shaft 7 which is then vertical, this shaft being driven through a belt system 9 driven by a motor-speed reducer unit 10. It can moreover be seen that the geometric axis of the rotary shaft 7 is concurrent with the geometric axis of rotation of the cradle about the trunnions 5, this last-mentioned axis being located above and at a certain distance from the upper side of the table 8.

The angular position of the cradle about its horizontal axis is controlled and determined by a motor unit 11 acting on one of the trunnions 5 to which the cradle is connected in rotation. By way of example, the extent of the swinging may be 90° from the position shown in the drawing in the clockwise direction and 100° in the counter-clockwise direction as shown in dotted lines.

The upper edges of the two posts 2 are constructed in the form of slideways of prismatic type. Slidable on the slideways in the longitudinal direction, i.e. in a horizontal direction perpendicular to the axis 5, is a general slide 13, by means of a screw drive 14 including balls rotated by a motor 15 mounted on the frame. This general slide 13 carries, on the front side, a horizontal slideway 16 on which are slidable horizontally and in a direction parallel to the axis 5 a saddle 18 by means of a screw 19 provided with balls driven by a motor 20 carried by the slide 13. The saddle itself has vertical slideways 21 on which is vertically slidable a milling head 22 by means of a screw 23 provided with balls and driven by a motor 24 carried by the saddle 18. The milling head 22 carries a vertical spindle 25 carrying the milling tool 26, this spindle 25 being driven in rotation through a belt transmission 27 by a motor 28 carried by the head 22. It will therefore be understood that by suitably acting on the motors 15, 20, and 24, the milling tool can be moved toward the workpiece to be machined carried by the table 8, irrespective of the rotational position of the table 8 about its shaft 7 and the swung position of the cradle 6 about its trunnions 5.

In its median part, the general slide 13 has, in a suitable vertical slideway, a slidable drum support 29. This support is vertically movable along an axis equidistant from the two posts 2 by means of a drive comprising a rack 30 and a wheel 31, the rack being driven by a motor 32 carried by the general slide 13. The barrel support 29 carries a vertical shaft 33 contained in the same plane equidistant from the two posts 2 and carrying at its lower end a drum 34 carrying tools, such as for example lathe tools 35 and boring tools 36 capable of being brought into position by the drum so as to permit, when the drum 34 approaches the cradle, effecting the desired operations.

When it is desired to machine a workpiece, it is fixed on the table 8 by the usual fixing means and if necessary the table 8 is then rotated through a certain angle about its shaft 7 if it is desired to carry out a drilling operation, and, if necessary, the cradle 6 is rotated also through a certain angle about its axis 5. In this way it is possible to present the workpiece in any geometric position and it is then sufficient to bring the milling head 22 with its tool 26 in the suitable position for milling. In order to effect turning operations the table 8 is rotated about the shaft 7 at the required speed after having modified the inclination of the cradle, for example by bringing it to a horizontal position instead of the vertical position shown in the drawing. For boring, by means of a tool such as the tool 36, the cradle is left in the vertical position and the table 8, which remains horizontal, is rotated.

The control of the various driving means which both position and carry out the machining may be effected in the conventional manner, for example manually, but it will be understood that the machine according to the invention is particularly well adapted to a numerical control.

Cones may be machined merely by lowering the tool below the workpiece-carrying table, which is rotating, and inclining the latter at the value of the slope of the cone relative to the vertical. The same is true for machining tapering screwthreads.

There is thus provided a universal machine in which, owing to the design of the invention, no part is in overhanging position. Consequently, all of the sides of the workpiece may be milled, turned, or bored with no risk of vibration and no dismounting of parts and, in the case of a numerical control, with no human intervention during the carrying out of the various machining operation.

Although the invention has been described with respect to a particular embodiment, it must be understood that it is no way limited thereto in that various modifications may be made therein without departing from the scope or the spirit of the invention.

What is claimed is:

1. A machining machine for a workpiece comprising:
    a machine frame including two parallel vertical posts in the form of walls, having tops, the tops of said walls providing two parallel horizontal upper slideways;
    a general slide extending transversally in relation to said posts and being movable along said slideways, said slide having mounted thereon a machining tool means for machining the workpiece including a turning means and at least another tool means;
    a cradle mounted on said posts to be movable about a horizontal pivot axis beneath said general slide;
    a table for receiving the workpiece to be machined, said table being rotatively mounted on said cradle about a rotary turning axis which is perpendicular to said horizontal pivot axis; and
    a mounting means which is mounted on said general slide, said mounting means mounting said machine tool means for movement in the three directions in space so that said machine tool means are moved toward said table while said table is also movable within a wide range of inclination of said cradle relative to the horizontal pivot axis of said cradle.

2. A machining machine according to claim 1, characterized in that the rotary axis of the table (8) is perpendicular with said horizontal axis of the cradle.

3. A machining machine according to claim 1, characterized in that the pivot axis of rotation (5) of the cradle (6) is located above the upper side of the table (8) receiving the workpiece to be machined.

4. A machining machine according to claim 1, characterized in that the general slide supports a movable drum support (29) which is tranversely movable toward the cradle, said support (29) having a shaft (33) carrying a drum (34) which carries turning and boring tools near the periphery thereof, said movable drum support also including a means for rotating said drum.

5. A machining machine according to claim 4, characterized in that the general slide (13) has a transverse slideway (16) on which is slidable a saddle (18) movable in a direction parallel to the pivot axis (5) of the cradle, said saddle (18) supporting a milling head (22) which is slidable in a direction perpendicular to the direction of displacement of the saddle and toward the cradle.

6. A machining machine according to claim 5, characterized in that the frame of the machine comprises a bed plate (1) and rear stiffeners for the two vertical posts.

7. A machining machine according to claim 5, characterized in that: the direction of displacement of the general slide (13) is horizontal and perpendicular to the pivot axis (5) of the cradle, the axis of displacement of the saddle is horizontal and parallel to said pivot axis (5), and the direction of displacement of the milling head (22) and of the drum support (29) is vertical.

8. A machining machine according to claim 7, characterized in that a pivoting motor (11) of the table is carried by one of the posts (2), a motor (10) of the table (8) is carried by the cradle (6), a motor (15) for displacing the general slide through a screw (14) is carried by the frame, motors (20,32) for displacing the saddle (18) and the drum support (29) are carried by the general slide (13), and a motor (24) for displacing the milling head (22) is carried by the saddle (18).

9. A machining machine according to claim 1 wherein said at least another tool means is a milling tool.

10. A machining machine according to claim 1 wherein said at least another tool means is a boring tool.

* * * * *